(12) United States Patent (10) Patent No.: US 9,372,200 B2
Liu (45) Date of Patent: Jun. 21, 2016

(54) ROTATION SPEED DETECTING DEVICE AND DETECTING METHOD THEREOF

(75) Inventor: Jui-Ta Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 646 days.

(21) Appl. No.: 13/369,309

(22) Filed: Feb. 9, 2012

(65) Prior Publication Data

US 2012/0310589 A1 Dec. 6, 2012

(30) Foreign Application Priority Data

Jun. 1, 2011 (CN) .......................... 2011 1 0152093

(51) Int. Cl.
*G01P 3/00* (2006.01)
*G01P 3/481* (2006.01)

(52) U.S. Cl.
CPC ...................................... *G01P 3/481* (2013.01)

(58) Field of Classification Search
None
See application file for complete search history.

(56) References Cited

U.S. PATENT DOCUMENTS 4,839,834 A * 6/1989 Omae et al. .................... 702/147
2006/0125439 A1* 6/2006 Ajima et al. ................... 318/716

FOREIGN PATENT DOCUMENTS

| CN | 87100273 | 7/1987 |
| CN | 2553383 | 5/2003 |
| CN | 101398439 | 4/2009 |
| JP | 2008096128 | 4/2008 |
| TW | I269115 | 12/2006 |
| TW | I294717 | 3/2008 |

* cited by examiner

*Primary Examiner* — Aditya Bhat
(74) *Attorney, Agent, or Firm* — Jianq Chyun IP Office

(57) ABSTRACT

A rotation speed detecting device is provided. The rotation speed detecting device is electrically connected to a motor of a color wheel, and includes a phase detecting unit and a time calculating unit. The phase detecting unit is suitable for detecting a reference phase point of a rotation information outputted by the motor, and outputting a phase signal according to the reference phase point. The time calculating unit is electrically connected to the phase detecting unit, and calculates a speed information of the motor according to the phase signal. In this way, the rotation speed of the motor of the color wheel is correctly measured.

11 Claims, 2 Drawing Sheets

ROTATION SPEED DETECTING DEVICE
AND DETECTING METHOD THEREOF

CROSS-REFERENCE TO RELATED
APPLICATION

This application claims the priority benefit of China application serial no. 201110152093.6, filed on Jun. 1, 2011. The entirety of the above-mentioned patent application is hereby incorporated by reference herein and made a part of this specification.

BACKGROUND OF THE INVENTION

1. Field of the Invention

The invention relates to a detecting device and a detecting method. Particularly, the invention relates to a detecting device for detecting a rotation speed of a motor of a color wheel and a detecting method thereof.

2. Description of Related Art

A reason why a projection apparatus can provide color images is because that a lighting system of the projection apparatus can sequentially provide a red, a green and a blue illumination beams to a light valve in the projection apparatus, so that the projection apparatus can sequentially project red, green and blue images on a screen. When the red, green and blue images are quickly cycled in a sequence, due to a visual staying effect, the red, green and blue images are mixed to form a color image, and this is why the projection apparatus can provide the color images.

Generally, the lighting system may transmit the illumination beams to pass through a rotating color wheel, and the color wheel is formed by a red fan-shaped filter, a green fan-shaped filter and a blue fan-shaped filter, so that after the illumination beams pass through the color filters of the rotating color wheel, a red beam, a green beam and a blue beam are sequentially formed. Moreover, the lighting system detects a rotation speed of the color wheel through a conventional detecting device to determine whether the color wheel normal operates, wherein the conventional detecting device can shield a light or let the light to pass through via a mark or a special structure on the color wheel, so as to detect the rotation speed of the color wheel and a start position of the color wheel. However, the conventional detecting device can be influenced by dust and other light sources to obtain an error result and a light intensity of the light source and a sensing distance have to be considered.

Taiwan Patent No. I269115 discloses a base locating device and a base locating method of a color wheel, in which a position of the color wheel is determined according to a through hole on the color wheel, so as to determine a switch time of signal modulation of a received one-way signal relative to various colors of the color wheel. Taiwan Patent No. I294717 discloses a motor driver, a motor controller and a method for controlling an electric motor, in which a position detecting circuit outputs a position signal corresponding to a position of a motor rotor, and a current command generating circuit and a space vector modulation control circuit select one of a plurality of stator coils according to the position signal, and control a current magnitude of the stator coil, so as to control the electric motor.

SUMMARY OF THE INVENTION

The invention is directed to a rotation speed detecting device and a detecting method thereof, by which a rotation speed of a motor is detected according to rotation information output by the motor, so as to correctly measure the rotation speed of the motor.

Additional aspects and advantages of the invention will be set forth in the description of the techniques disclosed in the invention.

To achieve one of or all aforementioned and other advantages, an embodiment of the invention provides a rotation speed detecting device, which is electrically connected to a motor of a color wheel, and includes a phase detecting unit and a time calculating unit. The phase detecting unit is used for detecting a reference phase point of rotation information outputted by the motor, and outputting a phase signal according to the reference phase point. The time calculating unit is electrically connected to the phase detecting unit, and calculates speed information of the motor according to the phase signal.

To achieve one of or all aforementioned and other advantages, an embodiment of the invention provides a rotation speed detecting method, adapted to detect a motor of a color wheel, which includes steps of receiving rotation information outputted by the motor; detecting a reference rotation point of the rotation information and outputting a phase signal according to the reference phase point; and calculating speed information of the motor according to the phase signal.

According to the above descriptions, in the rotation speed detecting device and the detecting method thereof, the rotation information outputted by the motor is detected to output the phase signal, and the rotation speed of the motor is detected according to the phase signal. In this way, the rotation speed of the motor can be correctly measured without being influenced by dust and other light sources.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED
EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
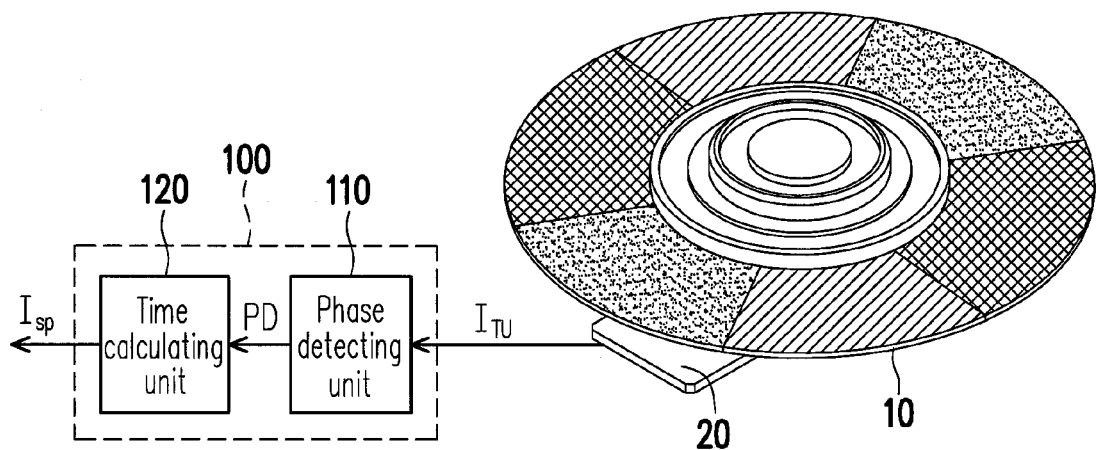
FIG. 1 is a system schematic diagram of a rotation speed detecting device electrically connected to a motor according to an embodiment of the invention.

FIG. 1 is a system schematic diagram of a rotation speed detecting device electrically connected to a motor according to an embodiment of the invention. Referring to FIG. 1, in the embodiment, the rotation speed detecting device 100 is electrically connected to a motor 20 for receiving rotation information $I_{TU}$ outputted by the motor 20, where the motor 20 is, for example, a stepping motor, and a color wheel 10 is installed on the motor 20. The rotation speed detecting device 100 includes a phase detecting unit 110 and a time calculating unit 120. The phase detecting unit 110 detects a reference phase point of the rotation information $I_{TU}$ outputted by the motor 20, and outputs a phase signal PD according to the reference phase point. Namely, each time when the phase detecting unit 110 detects the reference phase point, it correspondingly sends the phase signal PD once. The time calculating unit 120 is electrically connected to the phase detecting unit 110, and calculates speed information $I_{SP}$ of the motor 20 according to the phase signal PD. In this way, it is determined whether the motor 20 normally operates according to the speed information $I_{SP}$. Moreover, the rotation information $I_{TU}$ is outputted by the motor 20, and is not influenced by other light sources and dust, so that the rotation speed detecting device 100 can correctly measure the rotation speed of the motor 20.

Figure 2:
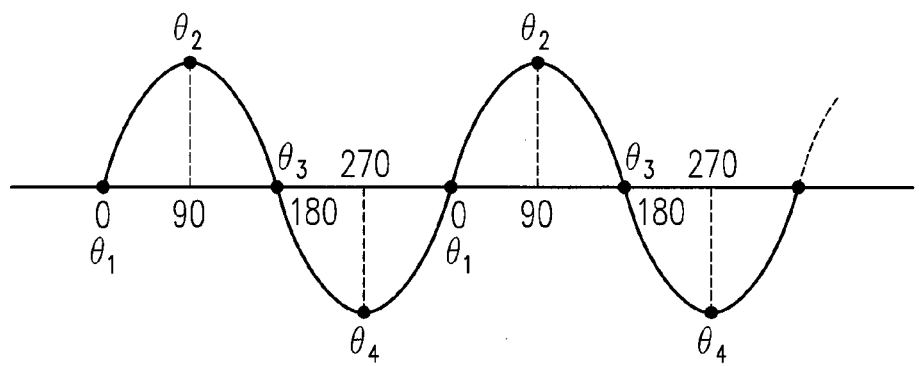
FIG. 2 is a waveform schematic diagram of the rotation information of FIG. 1 in a sine wave.

FIG. 2 is a waveform schematic diagram of the rotation information of FIG. 1 in a sine wave. Referring to FIG. 1 and FIG. 2, in the embodiment, an electromagnetic component (not shown) is configured in the motor 20 to output a complete sine wave when the motor 20 rotates for one round. Here, the reference phase point can be set at a 0-degree phase angle (i.e. $\theta_1$), a 90-degree phase angle (i.e. $\theta_2$), a 180-degree phase angle (i.e. $\theta_3$) or a 270-degree phase angle (i.e. $\theta_4$) of the sine wave. However, in other embodiments, the reference phase point can also be set at a phase angle of other degrees, which is not limited by the invention.

Here, the phase angle $\theta_1$ is taken as the reference phase point, and each time when the phase detecting unit 110 detects the phase angle $\theta_1$, it sends the phase signal PD once. Basically, a time interval between two adjacent phase angles $\theta_1$ is a time required for the motor 20 rotating for one round, so that the rotation speed (i.e. the speed information $I_{SP}$) of the motor 20 can be calculated. According to the above descriptions, the time calculating unit 120 calculates the speed information $I_{SP}$ of the motor 20 according to a time interval between two adjacent phase signals PD (the time interval between two adjacent phase angles $\theta_1$).

On the other hand, the rotation speed (i.e. the speed information $I_{SP}$) of the motor 20 can also be obtained according to a number of times that the phase angles $\theta_1$ is detected (corresponding to rotation rounds) within a predetermined time (for example, 1 second). According to the above description, the time calculating unit 120 calculates transmitting times of the phase signal PD within the predetermined time (i.e. the number of times that the phase angles $\theta_1$ is detected within the predetermined time), and calculates the speed information $I_{SP}$ of the motor 20 according to the predetermined time and the transmitting times of the phase signal PD.

Figure 3:
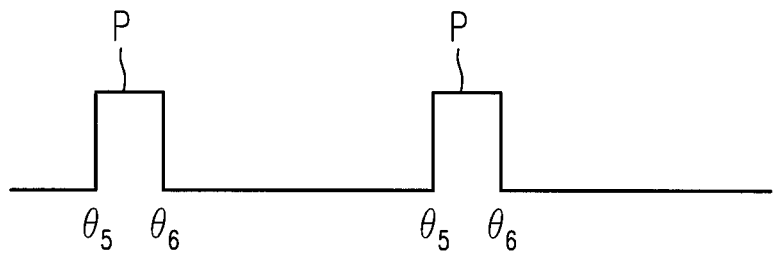
FIG. 3 is a waveform schematic diagram of the rotation information of FIG. 1 in pulses.

FIG. 3 is a waveform schematic diagram of the rotation information of FIG. 1 in pulses. Referring to FIG. 1 and FIG. 3, in the embodiment, an electromagnetic component is configured in the motor 20 to output a complete pulse P when the motor 20 rotates for one round, where a width of the pulse P can be determined according to the person of ordinary skill in the art and an actual design requirement. Here, the reference phase point can be set at one of a positive edge (i.e. a phase angle $\theta_5$) and a negative edge (i.e. a phase angle $\theta_6$) of the pulse.

Here, the phase angle $\theta_5$ is taken as the reference phase point, and each time when the phase detecting unit 110 detects the phase angle $\theta_5$, it correspondingly sends the phase signal PD once. Basically, a time interval between two adjacent phase angles $\theta_5$ is a time required for the motor 20 rotating for one round, so that the rotation speed (i.e. the speed information $I_{SP}$) of the motor 20 can be calculated. According to the above descriptions, the time calculating unit 120 calculates the speed information $I_{SP}$ of the motor 20 according to a time interval between two adjacent phase signals PD (the time interval between two adjacent phase angles $\theta_5$).

On the other hand, the rotation speed (i.e. the speed information $I_{SP}$) of the motor 20 can also be obtained according to a number of times that the phase angles $\theta_5$ is detected (corresponding to rotation rounds) within a predetermined time (for example, 1 second). According to the above description, the time calculating unit 120 calculates transmitting times of the phase signal PD within the predetermined time (i.e. the number of times that the phase angles $\theta_5$ is detected within the predetermined time), and calculates the speed information $I_{SP}$ of the motor 20 according to the predetermined time and the transmitting times of the phase signal PD.

Figure 4:
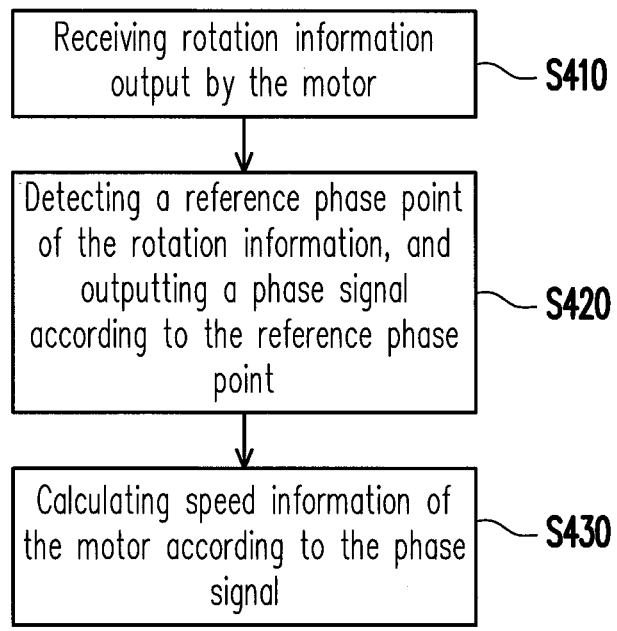
FIG. 4 is a flowchart illustrating a rotation speed detecting method according to an embodiment of the invention.

FIG. 4 is a flowchart illustrating a rotation speed detecting method according to an embodiment of the invention. Referring to FIG. 4, in the embodiment, rotation information outputted by a motor is first received (step S410). Then, a reference phase point of the rotation information is detected, and a phase signal is outputted according to the reference phase point (step S420). Finally, speed information of the motor is calculated according to the phase signal (step S430). Details of the above steps can refer to descriptions of the rotation speed detecting device 100, which are not repeated herein.

In summary, according to the rotation speed detecting device and the detecting method thereof, the rotation information outputted by the motor is detected to output the phase signal, and the rotation speed of the motor is detected according to the phase signal. In this way, the rotation speed of the motor can be correctly measured without being influenced by dust and other light sources.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rotation speed detecting device, electrically connected to a motor of a color wheel for a projector, and the rotation speed detecting device comprising:
   a phase detecting unit, adapted to detect a predetermined reference phase angle of a rotation information outputted by the motor during each duty cycle, and configured to output a phase signal based on the predetermined reference phase angle; and
   a time calculating unit, electrically connected to the phase detecting unit, and calculating a speed information of the motor according to the phase signal, wherein the time calculating unit calculates the speed information according to a time interval elapsed between two adjacent phase signals, wherein the two adjacent phase signals based on the same detected phase angle of the same rotation information, and the calculated speed information is used to detect the rotation of the motor of the color wheel for the projector.

2. The rotation speed detecting device as claimed in claim 1, wherein the rotation information is a sine wave.

3. The rotation speed detecting device as claimed in claim 2, wherein the predetermined reference angle is 0-degree phase angle of the sine wave.

4. The rotation speed detecting device as claimed in claim 2, wherein the predetermined reference angle is 90-degree phase angle of the sine wave.

5. The rotation speed detecting device as claimed in claim 1, wherein the rotation information is a pulse.

6. The rotation speed detecting device as claimed in claim 5, wherein the predetermined reference phase angle is a positive edge of the pulse.

7. The rotation speed detecting device as claimed in claim 5, wherein the predetermined reference phase angle is a negative edge of the pulse.

8. The rotation speed detecting device as claimed in claim 1, wherein the time calculating unit calculates transmitting times of the phase signal within a predetermined time, and calculates the speed information according to the predetermined time and the transmitting times.

9. The rotation speed detecting device as claimed in claim 1, wherein the motor s a stepping motor.

10. A rotation speed detecting method, adapted to detect a motor of a color wheel for a projector, and comprising:
    receiving a rotation information outputted by the motor;
    detecting a predetermined reference phase angle of the rotation information during each duty cycle, wherein the predetermined reference phase angle is a phase angle;
    outputting a phase signal based on the predetermined reference phase angle; and
    calculating and outputting a speed information of the motor according to a time interval elapsed between two adjacent phase signals, wherein the two adjacent phase signals based on the same detected phase angle of the same rotation information, and the calculated speed information is used to detect the rotation of the motor of the color wheel for the projector.

11. The rotation speed detecting method as claimed in claim 10, wherein the step of calculating the speed information of the motor according to the phase signal comprises:
    calculating transmitting times of the phase signal within a predetermined time; and
    calculating the speed information according to the predetermined time and the transmitting times.

* * * * *